Jan. 13, 1953 J. B. WINTHER 2,625,037
ELECTRONIC TORQUE CONTROL
Filed May 31, 1949 2 SHEETS—SHEET 2

Patented Jan. 13, 1953

2,625,037

UNITED STATES PATENT OFFICE 2,625,037

ELECTRONIC TORQUE CONTROL

Jerrold B. Winther, Kenosha, Wis., assignor to Martin P. Winther, Waukegan, Ill., as trustee Application May 31, 1949, Serial No. 96,290

9 Claims. (Cl. 73—134)

This invention relates to an electronic torque control, and more particularly, to an electronic control circuit for regulation of dynamometers and the like.

In general, the invention comprises dynamo-electric apparatus such as an electric dynamometer having a relatively rotary driving member and a relatively fixed stator. A field coil controls the degree of coupling between the two members, and thereby, the amount of torque transmitted by the dynamometer. The relatively fixed member is mounted for limited rotary movement and has an arm extending radially for torque measuring purposes. The coil is excited by an electronic circuit which includes control means for varying the coil excitation in accordance with certain conditions including torque. In particular, the circuit is adapted to decrease the coupling by reducing the field coil excitation when the torque exerted by the dynamometer rises, as upon change in certain uncontrolled conditions such as temperature and the like. This stabilizes the torque transmitted. An inverse effect can also be obtained when for any reason the torque tends to decrease. The circuit includes a mechano-electronic transducer having relatively movable electrodes, the spacing of which is controlled by the torque measuring arm of the dynamometer through a suitable mechanical connection therebetween.

Thus, among the several objects of the invention, may be noted the provision of an electronic control circuit for improved torque stabilization and regulation of a dynamometer or the like; the provision of a torque control of the class described which is responsive to a small deflection of the dynamometer stator member; and, the provision of a torque control of this class which minimizes problems of dynamometer oscillation and hunting. Other features will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

Figure 1:
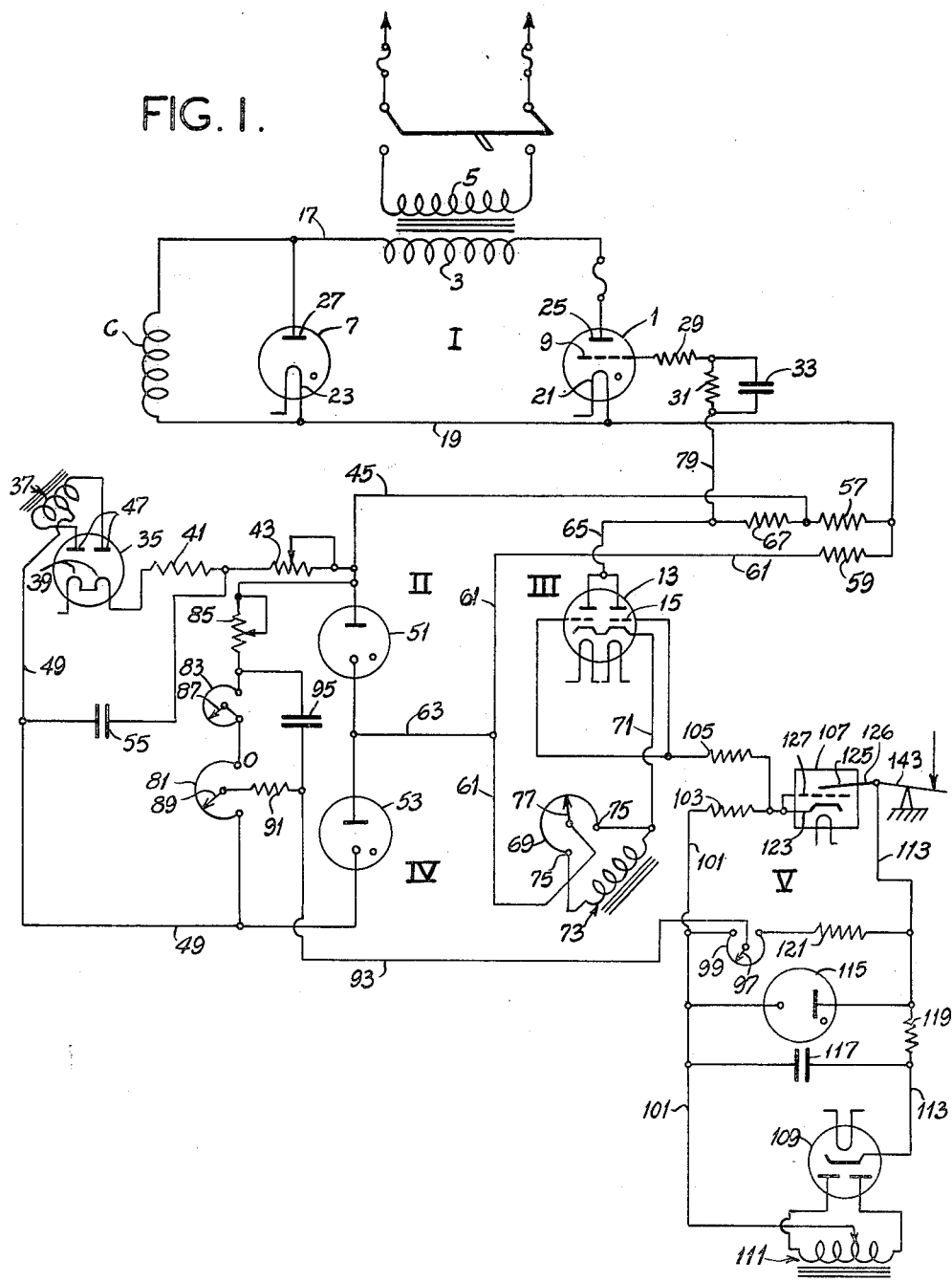
Figure 2:
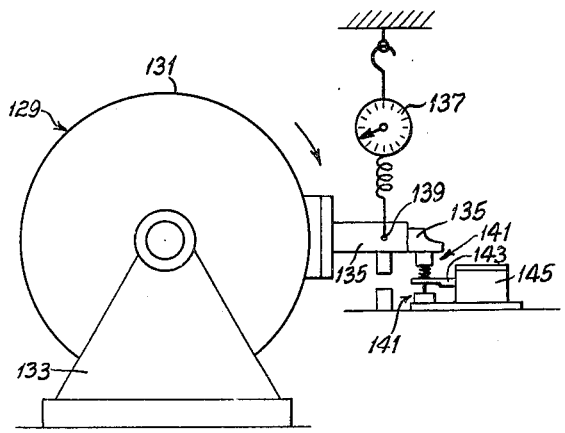
Figure 3:
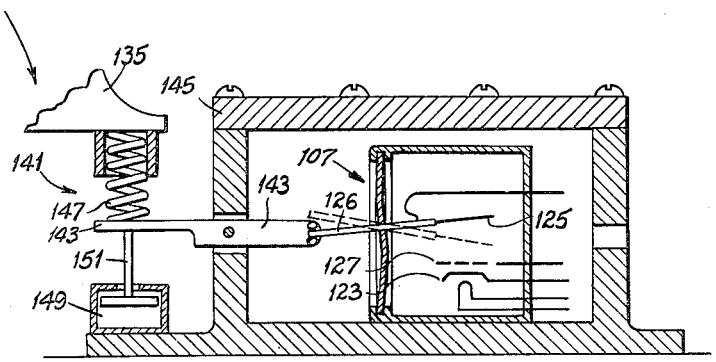

In the accompanying drawings, in which one of various possible embodiments of the invention is illustrated, Fig. 1 is a diagram of the electronic circuit of this invention;

Fig. 2 is a diagrammatic end view of a dynamometer illustrating certain parts of the invention; and, Fig. 3 is an enlarged diagrammatic sectional view of certain parts shown in Fig. 2.

Similar reference characters represent corresponding parts throughout the several views of the drawings.

In testing certain machinery, for example a diesel engine, it is sometimes necessary to make a load trial run extending over a considerable period, perhaps over several days. During the test run, certain uncontrolled conditions such as temperatures vary, with consequent effects upon the operation of both the driving and the driven machine. There have been a number of circuits devised for the purpose of speed regulation, that is, to govern or hold the speed of the machines constant under varying conditions. An exemplary circuit is shown in the United States Patent 2,277,284 relating to clutches, but which can be readily adapted for dynamometers. In United States Patent 2,220,032, there is illustrated an eddy-current dynamometer having a rotary member driven by an engine and a relatively fixed stator member. The relatively fixed member may be journalled for limited rotary movement so that torque can be measured by means of a radial arm and an associated scale or indicator. The driven member and the relatively fixed member are coupled together by a magnetic field induced by a suitable field coil. The excitation of the field coil determines the amount of slip between the respective members or conversely the amount of torque exerted upon the driven member.

In speed control circuits of the type contemplated, a grid-controlled power tube feeds direct current to the field coil. The field excitation and thereby the amount of slip is determined by two voltage components applied in opposed relation to the control grid. An adjustable reference voltage determines the current flow through the grid-controlled rectifier tube which produces the desired amount of coupling, and thereby, the desired speed or amount of slip. A voltage responsive to the speed of the driven member is applied to counteract variations in speed. When the speed increases, the speed responsive voltage increases thereby causing the rectifier tube to conduct more, tighten the coupling and reduce the speed. In these circuits, the torque is allowed to vary.

The present invention has for its purpose the provision of an electronic circuit adapted for regulation of torque. One of the principal problems of torque regulation results from the tendency of the dynamometer, particularly the relatively fixed member thereof, to oscillate or hunt under the influence of a spring scale mechanically connected to the torque arm. The problem is so acute in some instances that a direct reading on the torque scale cannot be obtained, but instead the two extremes of movement of the scale indicator are taken and the torque is obtained by averaging the two extremes of movement. A solution to the problem has been achieved by having a high spring load for the scale and a small amount of deflection, for example, .04 inch as a maximum deflection for maximum load or maximum torque. However, such a small total deflection necessarily introduces complications in the provision of a torque control for the dynamometer. The circuit of this invention is particularly adapted for torque control in that it is responsive to small amounts of deflection of the relatively fixed stator of a dynamometer.

Referring to Fig. 1, there is shown a circuit for the torque regulating control of the invention. To facilitate subsequent description, the circuit may be considered as divided into several parts, as follows: Part I, main power supply; part II, constant voltage source for control of the main power supply; part III, variable voltage source for control of the main power supply; part IV, adjustable reference voltage source for control of the variable voltage source; and, part V, torque responsive voltage source for control of the variable voltage source.

Circuit part I includes a dynamometer field coil C, the excitation of which is to be varied for purposes of torque regulation. Direct current is fed to coil C through a grid-controlled rectifier tube 1 and a transformer secondary 3. The primary 5 of the transformer is connected to a suitable source of alternating current. A second rectifier tube 7 is connected across the field coil so as to absorb inductive discharge of the coil while not shorting the coil during conduction of tube 1. Tube 7 may be considered as a so-called "back rectifier" the purpose of which is to smooth out flow of direct current through coil C. The degree of coil excitation is controlled by the voltage impressed upon the control grid 9 of tube 1.

There are two voltage components impressed upon the grid 9. Circuit part II impresses a constant positive potential upon the grid and circuit part III impresses a variable negative potential upon the grid in opposition to the constant positive potential of circuit part II. Thus, as the voltage source III is increased, the grid 9 tends to swing negative and vice versa.

The voltage of source III is in turn controlled by the circuit parts IV and V through a second grid-controlled vacuum tube 13 included in circuit part III. Circuit part IV impresses an adjustable negative potential upon the control grid 15 of tube 13. Circuit part V tends to impress upon the control grid 15 a positive potential, which is directly proportional to dynamometer torque. When the torque increases, source V raises the grid bias of tube 13, thereby causing tube 13 and source III to apply a greater negative potential to grid 9 of the main power tube 1. The increased negative potential at grid 9 reduces conduction of tube 1, and thereby, the excitation of the field coil to lessen coupling and reduce torque.

More specifically, the circuit portion I comprises the main power grid-controlled rectifier tube 1 and the main power supply transformer secondary 3 connected in series with the coil C by means of lines 17 and 19. The "back rectifier" tube 7 is connected across lines 17 and 19 between the coil and the elements 1 and 3. The cathodes 21 and 23 of the respective tubes 1 and 7 are both connected to the same line 19, and the secondary 3 is connected in line 17 between the respective plates 25 and 27. A grid current limiting resistor 29 and ripple filter consisting of resistor 31 and capacitor 33 are provided at the control grid 9.

A constant D. C. voltage source for circuit parts II and IV is provided by means of a double full-wave rectifier tube 35 energized through transformer 37 connected across the twin plates 47 thereof. Only the secondary of the transformer is shown, but it will be understood there is a primary connected to a suitable source of alternating current. The twin cathodes 39 of tube 35 are connected through a resistor 41 and an adjustable resistor 43 to a lead 45. The twin plates 47 are connected through a center tap of transformer 37 to a lead 49. A pair of voltage regulator tubes 51 and 53 are connected between leads 45 and 49, tube 51 being connected adjacent lead 45 and tube 53 adjacent lead 49. A filtering capacitor 55 is connected across resistor 41, tube 35 and transformer 37.

Circuit part II includes, in series, lead 45, a resistor 57, a resistor 59, a lead 61 and a connection 63 intermediate the two voltage regulator tubes 51 and 53. A constant D. C. voltage is impressed across the lead 45 and connection 63, the value being dependent upon the rating of tube 51. Lead 45 is positive with respect to connection 63.

Circuit part III includes, in series, the double triode 13, operated as a grid-controlled half-wave rectifier, a plate connection 65, a resistor 67, connection 45, lead 63, lead 61, an adjustable portion of a voltage divider 69 and a cathode connection 71. Power is supplied to the circuit by means of a transformer 73 connected across the fixed terminals 75 of the voltage divider 69. Its adjusting arm 77 connects with lead 61 and one of the fixed terminals 75 connects with the cathode connection 71 of tube 13. A variably controlled D. C. voltage is impressed across the plate connection 65 and the lead 61.

The grid circuit for the main power tube 1 is formed through line 19 extending from the power tube cathode 21 to one end of resistor 57 adjacent the resistor 59, through the resistor 57, the resistor 67 and a grid connection 79. Connection 79 feeds to the control grid 9 through filtering elements 31 and 33 and resistor 29. Voltage source II impresses a constant positive D. C. voltage upon the grid 9 by means of resistor 57 included in the circuit part II and the grid circuit of tube 1. Voltage source III impresses a variably controlled negative D. C. voltage upon grid 9 by means of resistors 57 and 67 and the grid circuit of tube 1.

Conduction of tube 13 is under the control of voltage sources IV and V feeding to its control grids 15.

Across the voltage regulator tubes 51 and 53, and in series with one another are a main speed control voltage divider 81, a speed trimmer adjustable resistor 83 and an adjustable resistor 85. The latter connects at one end with lead 45 and at the other end with a fixed terminal of the resistor 83. The fixed terminals of voltage divider 81 connect with lead 49 and with the other fixed terminal of resistor 83. The adjusting arm 87 of trimmer 83 is connected to short out portions of the trimmer. The main control adjusting arm 89 connects through a resistance 91 with a lead 93. A capacitance 95 is connected from the juncture of resistance 91 and lead 93 across resistance 91, the voltage divider arm 89, and trimmer 83 to the juncture of resistor 85 and trimmer 83. Resistance 91 and capacitance 95 act as damping means with respect to voltage changes effected by adjustment of control 81, as will be subsequently described.

Lead 93 connects with the control grid 15 of tube 13 through an adjusting arm 97 of a voltage divider 99, a line 101, a resistor 103 and a grid current limiting resistor 105. The grid circuit of tube 13 is completed through the cathode connection 71, the voltage divider 69, its adjusting arm 77, the lead 61 and the connection 63. The circuit element values are such that the voltage drop from lead 49 to point 0 on voltage divider 81 (adjacent the trimmer 83) is substantially equal to the voltage drop from lead 49 to the connection 63 across tube 53. Thus, when control arm 89 is at the 0 position, circuit part IV does not apply a voltage to the grid 15 of tube 13. However, when the arm 89 is moved away from the 0 position, a negative voltage is applied to the grid as a result of the unbalance of the circuit. It will be understood that point 0 on voltage divider 81 may be at a positive potential with respect to connection 63, the arm 89 then being swung through an equilibrium point and beyond to produce a negative voltage with respect to connection 63.

Circuit part V includes, in series, a constant D. C. voltage source, a mechano-electronic transducer or movable electrode vacuum tube 107, and the resistor 103. Tube 107 is operated as a variable resistance, the impedance of which is varied in accordance with the torque developed by the dynamometer as will appear. A full-wave rectifier tube 109 having a transformer 111 connected across its twin plates feeds direct current to lines 101 and 113. Line 101 connects with a center tap on transformer 111 and line 113 connects with the cathode of tube 109 and is positive with respect to line 101. For voltage regulating purposes a voltage regulator tube 115 and a capacitor 117 are connected across lines 101 and 113, and a resistor 119 is inserted in line 113 between elements 115 and 117. The aforementioned voltage divider 99 is connected in series with a resistor 121 across the lines 101 and 113. Line 101 leads to the resistor 103 which in turn connects with the cathode 123 of the tube 107. The plate 125 of tube 107 is connected to the line 113.

The mechano-electronic transducer 107, shown diagrammatically herein, is an electronic tube adapted to transmit mechanical movements into electrical effects. Such a tube is the "RCA-5734" mechano-electronic triode. One type of such a tube has a relatively stiff diaphragm at one end of a cylindric metal envelope, through which extends a lever 126 carrying interiorly a plate electrode 125. Plate 125 is relatively movable with respect to a cathode electrode 123 and a grid 127 by means of lever 126. The tube is very sensitive inasmuch as one degree variation of the lever carrying the plate results in a 40 volt change in the drop across the cathode and plate. The aforementioned mechano-electronic triode has a control grid shown at 127 which in this application thereof may be connected direct to the cathode 123.

The arm 97 of voltage divider 99 is adjusted so that when the movable electrode 125 is at no-load deflection or maximum spacing from the fixed electrode 123, the voltage drop from line 101 to arm 97 is substantially equal to the voltage drop across resistor 103. When the movable electrode 125 is at its maximum spacing, the transducer 107 exerts its maximum impedance and a minimum current flows through resistor 103 and a minimum voltage drop appears across the resistor. As electrode 125 is moved toward the fixed electrode 123, the voltage drop across resistor 103 increases and a positive potential is applied to the control grid 15 of tube 13. The voltage drops referred to above are with reference to the D. C. voltage across lines 101 and 113 supplied by tube 109 and transformer 111. Circuit part IV will tend to produce an opposite effect upon the control grid 15 of tube 13.

The mechano-electronic transducer 107 is mechanically coupled to a dynamometer in a manner such that its electrical characteristics are varied in response to torque changes exerted by the dynamometer. Referring to Fig. 2, the machine is generally indicated at 129 as having a relatively fixed stator or casing 131 axially mounted on pedestals 133 for limited rotary movement. Extending radially from the stator 131 is a torque arm 135. Rotary movement of the stator and the associated torque arm 135 is resisted by a scale or indicator 137 connected to the free end of the torque arm at 139. The indicator 137 is of a type adapted to yieldingly resist movement of the torque arm, the amount of movement or deflection being an indication of the torque exerted by the arm. Also, the indicator preferably has a relatively small deflection per unit of force. Such an indicator is a spring scale having a relatively high spring load. Movement of the arm 135 is communicated to the plate 125 of triode 107 through a spring driven dash-pot generally indicated at 141 and a pivoted lever 143. Lever 143 is pivoted on the vertical wall of a protective casing 145 and extends inwardly therethrough to engage the outer end of lever 126 which carries plate 125. The spring driven dash-pot 141 comprises a spring 147 mounted between the outer end of lever 143 and the free end of torque arm 135. A dash-pot 149 is fixed opposite the spring with its piston 151 engaging the end of lever 143. As torque arm 135 is driven downward under increasing torque, the plate 125 of triode 107 is also driven downward to reduce the impedance of the transducer.

It will be understood the dynamometer 129 comprises a stator as indicated at 131 and a rotor driven by a prime mover, the rotor having an electric slip coupling with the stator through a magnetic field induced by a field coil such as indicated at C in Fig. 1. When the excitation of field coil C is increased, the coupling between the rotor and the stator is tightened, the torque exerted by the dynamometer is increased and generally the speed of the rotor is decreased.

Operation is as follows:

Initially the dynamometer exerts no torque and accordingly the electrode 125 of the torque responsive transducer is at its maximum distance from the fixed electrode 123. Arm 97 of voltage divider 99 is adjusted with respect to this condition, so that circuit part V is balanced and exerts no effect upon the control tube 13. Arm 89 of the main control voltage divider 81 is at the zero position and consequently exerts a minimum effect upon the grid 15 of tube 13. In this condition, circuit part III impresses a maximum negative voltage upon the power tube grid 9. The main power tube 1 is passing a minimum current and excitation of coil C is at a minimum.

Torque is developed by swinging arm 89 away from the zero position. It will be noted that though movement of arm 89 is somewhat rapid, the electrical effect thereof is delayed by the action of capacitance 95 and resistance 91 so as to prevent hunting. As was pointed out previously, the voltage impressed upon the grid 15 of tube 13 is the difference between the voltage across voltage regulator tube 53 and the voltage drop from arm 89 and line 49. Inasmuch as the effect of trimmer 83 is nominal, this voltage differential (the output of circuit part IV) is substantially equal to the voltage across voltage divider 81 from point zero to arm 89 or across the capacitor 95. The relatively high resistance 91 prevents the voltage across capacitor 95 from building up rapidly, and consequently, the actual reference voltage applied to the grid 15 is relatively slow in building up regardless of the operator's speed of manipulation of the arm 89.

As increasing negative voltage is applied to grid 15, conduction of tube 13 is reduced and conduction of tube 1 is increased, thereby increasing the torque exerted by the dynamometer. When torque is developed, the levers 126 and 143 of the torque responsive transducer are deflected to space the electrode 125 closer to the fixed electrode 123. The transducer exerts a relatively lesser impedance and increased current flows through resistor 103. The increased current through resistor 103 results in an increased positive voltage at the control grid 15. The effect is to increase the conduction of tube 13 and thereby limit conduction of the main power tube 1. The positive voltage from voltage source V increases until an equilibrium point is reached, at which point the load is steady. Adjustment of arm 89 may be continued until the dynamometer runs at the desired speed and torque.

The torque regulating operation of the circuit is as follows:

After the dynamometer has run for some time, the temperature therein will rise, and as a result, the magnetic gap between the rotor and the stator increases to cause a decrease in the magnetic field. Such a field decrease results in a reduction of the coupling effect between the rotor and the stator and thereby the braking action decreases. When the torque decreases, levers 126 and 143 deflect in a manner such that plate 125 of the transducer moves away from the cathode. The impedance of the transducer increases and the voltage drop across resistor 103 decreases. The reduced voltage drop at 103 results in a reduced positive potential at control grid 15 of tube 13. Conduction of tube 13 decreases and a net positive increase (from voltage source II) at grid 9 of the main power tube causes the power tube to supply more current to the field coil and thereby tighten the coupling and return the load to the desired value. The circuit operates to hold torque constant regardless of extraneous steady or transient effects tending to cause variations.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. A torque regulating control for a dynamometer having a coil controlling braking action thereof, comprising an electronic circuit controlling braking action of the dynamometer braking coil, said electronic circuit including a grid-controlled main power tube feeding direct current to said coil and having a control grid, an adjustable reference voltage source for impressing a voltage upon the control grid of said main power tube, and a torque-responsive voltage source including a mechano-electronic triode for impressing a voltage upon the control grid of said main power tube.

2. A torque regulating control for a dynamometer having a coil controlling braking action thereof, comprising an electronic circuit controlling excitation of said coil, said electronic circuit including a grid-controlled main power tube feeding direct current to said coil and having a control grid, a first voltage source impressing a positive voltage upon the control grid of said main power tube, a second voltage source impressing a negative voltage upon the control grid of said main power tube, said second voltage source including a mechano-electronic transducer for varying the voltage of said second voltage source in direct proportion to the torque developed by the dynamometer.

3. A torque regulating control for a dynamometer having a coil controlling braking action thereof, comprising an electronic circuit controlling excitation of the coil, said electronic circuit including a grid-controlled main power tube feeding direct current to said coil, a first voltage source impressing a positive voltage upon the control grid of said main power tube, a second voltage source impressing a negative voltage upon the control grid of said main power tube, said second voltage source including a second grid-controlled vacuum tube having a control grid, an adjustable reference voltage source impressing a negative voltage upon the control grid of said second grid-controlled vacuum tube, and a torque-responsive voltage source impressing a positive voltage directly proportional to the torque developed by the dynamometer upon the control grid of said second grid-controlled vacuum tube.

4. A torque control comprising an electronic circuit having a first circuit part including a grid-controlled main power tube and a grid circuit therefor, a second circuit part including in series a constant D. C. current source and a resistor in the grid circuit of said main power tube, a third circuit part including in series a grid-controlled vacuum tube, a current source and a resistor in the grid circuit of said main power tube, a fourth circuit part including in series a D. C. voltage source and a resistance in the grid circuit of said grid-controlled vacuum tube, and a fifth circuit part including in series a D. C. voltage source, a mechano-electronic transducer and a resistance in the grid circuit of said grid-controlled vacuum tube, said mechano-electronic transducer being operated as a torque-responsive variable impedance.

5. A torque regulating control for an eddy-current dynamometer having a field coil controlling braking action thereof, comprising an electronic circuit controlling excitation of the coil, said electronic circuit having a first circuit part including in series a grid-controlled main power tube, a current source and said field coil, said main power tube having a grid circuit, a second circuit part including in series a constant D. C. current source and a resistor in the grid circuit of said main power tube, a third circuit part including in series a second grid-controlled vacuum tube, a current source and a resistor in the grid circuit of said main power tube, a fourth circuit part including in series an adjustable D. C. voltage source and a resistance in the grid circuit of said second grid-controlled vacuum tube, and a fifth circuit part including in series a D. C. voltage source, a mechano-electronic transducer and a resistance in the grid circuit of said second grid-controlled vacuum tube, said mechano-electronic transducer being operated as a torque-responsive variable impedance.

6. A torque control comprising an electronic circuit having a first part including a grid-controlled main power tube having a grid circuit, said electronic circuit having a second part including in series a voltage source and a resistance, said resistance being connected in the grid circuit of said main power tube, said electronic circuit having a third part including in series a current source, a grid-controlled vacuum tube and a second resistance, said second resistance being connected in the grid circuit of said main power tube, said electronic circuit having a fourth part including in series an adjustable voltage source, a third resistance, the grid of said grid-controlled vacuum tube and the cathode of said grid-controlled vacuum tube, and said electronic circuit having a fifth part including in series a constant voltage source, said third resistance, and a mechano-electronic transducer operated as a torque-responsive variable impedance, the impedance of said transducer varying directly with torque.

7. A torque regulating control comprising an electronic circuit having a first part including a grid-controlled main power tube having a grid circuit, said electronic circuit having a second part including in series a constant D. C. voltage source and a resistance, said resistance being connected in the grid circuit of said main power tube in such manner as to apply a positive voltage to the control grid of the main power tube, said electronic circuit having a third part including in series a current source, a grid-controlled vacuum tube and a second resistance, said second resistance being connected in the grid circuit of said main power tube in such manner as to apply a negative voltage to the control grid of the main power tube, said electronic circuit having a fourth part including in series an adjustable D. C. voltage source, a third resistance, the grid of said grid-controlled vacuum tube and the cathode of said grid-controlled vacuum tube, the polarity of the adjustable D. C. voltage source being such as to apply a negative voltage to the control grid of said grid-controlled vacuum tube, and said electronic circuit having a fifth part including in series a constant D. C. voltage source, said third resistance, and a mechano-electronic triode operated as a torque-responsive variable impedance, the impedance of said triode varying directly with the torque.

8. A torque regulating control for an eddy-current dynamometer having a field coil controlling braking action thereof, comprising an electronic circuit controlling excitation of the coil, said electronic circuit having a first part including in series a grid-controlled main power tube, a current source and said field coil, said electronic circuit having a second part including in series a constant D. C. voltage source and a resistance, said resistance being connected in the grid circuit of said main power tube in such manner as to apply a positive voltage to the control grid of the main power tube, said electronic circuit having a third part including in series a current source, a second grid-controlled vacuum tube and a second resistance, said second resistance being connected in the grid circuit of said main power tube in such manner as to apply a negative voltage to the control grid of the main power tube, said electronic circuit having a fourth part including in series an adjustable D. C. voltage source and a third resistance, said third resistance being connected in the grid circuit of said second grid-controlled vacuum tube, the polarity of the adjustable D. C. voltage source being such as to apply a negative voltage to the control grid of said second grid-controlled tube, and said electronic circuit having a fifth part including in series a constant D. C. voltage source, said third resistance, and a mechano-electronic triode operated as a torque-responsive variable impedance, the impedance of said triode varying directly with the torque developed by the dynamometer and the polarity of said fifth part being such as to apply a positive voltage to the control grid of said second vacuum tube.

9. A torque control comprising a grid-controlled main power tube, an adjustable reference voltage source for impressing a voltage upon the control grid of said main power tube, and a torque responsive voltage source for impressing a voltage upon the control grid of said main power tube, said adjustable reference voltage source including a D. C. voltage input, a voltage divider, and output connections, a capacitance connected across the output connections and a relatively high value resistance in series with output connections between said voltage divider and said capacitance whereby the electrical effect from rapid adjustment of the voltage divider is delayed.

JERROLD B. WINTHER.

REFERENCES CITED

The following references are of record in the file of this patent:

UNITED STATES PATENTS

| Number | Name | Date |
|---|---|---|
| 854,996 | Garland | May 28, 1907 |
| 2,043,147 | Bestoso | June 2, 1936 |
| 2,155,419 | Gunn | Apr. 25, 1939 |
| 2,168,031 | Howe | Aug. 1, 1939 |
| 2,287,796 | Hall | June 30, 1942 |
| 2,436,345 | Wrathall | Feb. 17, 1948 |
| 2,436,346 | Wrathall et al. | Feb. 17, 1948 |
| 2,450,479 | Lindsay | Oct. 5, 1948 |